United States Patent
Maskall et al.

(10) Patent No.: US 7,610,172 B2
(45) Date of Patent: Oct. 27, 2009

(54) METHOD AND SYSTEM FOR MONITORING NON-OCCURRING EVENTS

(75) Inventors: Brian Maskall, Hertfordshire (GB); Mark Vernon, Hilliard, OH (US); Rick Metzger, Westerville, OH (US)

(73) Assignee: JPMorgan Chase Bank, N.A., New York, NY (US)

( * ) Notice: Subject to any disclaimer, the term of this patent is extended or adjusted under 35 U.S.C. 154(b) by 273 days.

(21) Appl. No.: 11/622,843

(22) Filed: Jan. 12, 2007

(65) Prior Publication Data

US 2007/0294056 A1    Dec. 20, 2007

Related U.S. Application Data

(60) Provisional application No. 60/805,044, filed on Jun. 16, 2006.

(51) Int. Cl.
*G06F 11/30* (2006.01)
*G06F 11/00* (2006.01)

(52) U.S. Cl. .............. 702/183; 702/122; 702/187; 702/188; 709/224; 714/46

(58) Field of Classification Search ......... 702/181–184, 702/187–189, 119–123; 709/206, 224, 226; 714/46
See application file for complete search history.

(56) References Cited

U.S. PATENT DOCUMENTS

| | | |
|---|---|---|
| 4,751,702 A | 6/1988 | Beier et al. |
| 5,027,269 A | 6/1991 | Grant et al. |
| 5,301,320 A | 4/1994 | McAtee et al. |
| 5,325,527 A | 6/1994 | Cwikowski et al. |
| 5,499,371 A | 3/1996 | Henninger et al. |
| 5,539,885 A | 7/1996 | Ono et al. |
| 5,553,235 A | 9/1996 | Chen et al. |
| 5,566,297 A | 10/1996 | Devarakonda et al. |
| 5,594,863 A | 1/1997 | Stiles |
| 5,630,047 A | 5/1997 | Wang |

(Continued)

FOREIGN PATENT DOCUMENTS

WO    WO 01/35209    5/2001

(Continued)

OTHER PUBLICATIONS

Dolev, et al., An Integrated Architecture for the Scalable Delivery of Semi-Dynamic Web Content, Proceedings of the Seventh International Symposium on Computers and Communications, IEEE, 2002.

(Continued)

*Primary Examiner*—Edward Raymond
*Assistant Examiner*—Phuong Huynh
(74) *Attorney, Agent, or Firm*—Hunton & Williams LLP (57) ABSTRACT

According to an embodiment of the present invention, a computer implemented method and system for monitoring objects relating to event may include receiving an event message; filtering the event message to identify at least one object; comparing a current status of the object with an expected status for the object; and identifying a non-occurrence of an event associated with the object based at least in part on the step of comparing. In addition, the method and system may further provide generating a notification message identifying the non-occurrence; and sending the notification message to an intended recipient via a preferred mode of communication.

16 Claims, 2 Drawing Sheets

U.S. PATENT DOCUMENTS

| | | |
|---|---|---|
| 5,630,173 A | 5/1997 | Oprescu |
| 5,673,403 A | 9/1997 | Brown et al. |
| 5,689,698 A | 11/1997 | Jones et al. |
| 5,692,181 A | 11/1997 | Anand et al. |
| 5,712,971 A | 1/1998 | Stanfill et al. |
| 5,717,925 A | 2/1998 | Harper et al. |
| 5,732,262 A | 3/1998 | Gillespie et al. |
| 5,734,887 A | 3/1998 | Kingberg et al. |
| 5,737,592 A | 4/1998 | Nguyen et al. |
| 5,761,499 A | 6/1998 | Sonderegger |
| 5,768,119 A | 6/1998 | Havekost et al. |
| 5,784,557 A | 7/1998 | Oprescu |
| 5,790,809 A | 8/1998 | Holmes |
| 5,801,689 A | 9/1998 | Huntsman |
| 5,802,367 A | 9/1998 | Held et al. |
| 5,806,075 A | 9/1998 | Jain et al. |
| 5,815,415 A | 9/1998 | Bentley et al. |
| 5,845,292 A | 12/1998 | Bohannon et al. |
| 5,889,992 A | 3/1999 | Koerber |
| 5,899,990 A | 5/1999 | Maritzen et al. |
| 5,926,637 A | 7/1999 | Cline et al. |
| 5,930,768 A | 7/1999 | Hooban |
| 5,937,198 A | 8/1999 | Nelson et al. |
| 5,937,402 A | 8/1999 | Pandit |
| 5,946,458 A | 8/1999 | Austin et al. |
| 5,949,412 A | 9/1999 | Huntsman |
| 5,960,200 A | 9/1999 | Eager et al. |
| 5,960,445 A | 9/1999 | Tamori et al. |
| 5,987,247 A | 11/1999 | Lau |
| 5,999,179 A | 12/1999 | Kekic et al. |
| 6,003,075 A | 12/1999 | Arendt et al. |
| 6,009,274 A | 12/1999 | Fletcher et al. |
| 6,009,405 A | 12/1999 | Leymann et al. |
| 6,011,916 A | 1/2000 | Moore et al. |
| 6,046,742 A | 4/2000 | Chari |
| 6,052,456 A | 4/2000 | Huang |
| 6,065,009 A | 5/2000 | Leymann et al. |
| 6,083,276 A | 7/2000 | Davidson et al. |
| 6,101,489 A | 8/2000 | Lannert et al. |
| 6,101,601 A | 8/2000 | Matthews et al. |
| 6,108,698 A | 8/2000 | Tenev et al. |
| 6,148,296 A | 11/2000 | Tabbara |
| 6,163,776 A | 12/2000 | Periwal |
| 6,173,439 B1 | 1/2001 | Carlson et al. |
| 6,178,409 B1 | 1/2001 | Weber et al. |
| 6,184,996 B1 | 2/2001 | Gase |
| 6,185,613 B1 | 2/2001 | Lawson et al. |
| 6,195,676 B1 | 2/2001 | Spix et al. |
| 6,226,684 B1 | 5/2001 | Sung et al. |
| 6,230,319 B1 | 5/2001 | Britt, Jr. et al. |
| 6,246,410 B1 | 6/2001 | Bergeron et al. |
| 6,249,877 B1 | 6/2001 | Kawakami et al. |
| 6,253,193 B1 | 6/2001 | Ginter et al. |
| 6,272,556 B1 | 8/2001 | Gish |
| 6,282,698 B1 | 8/2001 | Baker et al. |
| 6,288,790 B1 | 9/2001 | Yellepeddy et al. |
| 6,289,336 B1 | 9/2001 | Melton et al. |
| 6,292,933 B1 | 9/2001 | Bahrs et al. |
| 6,298,353 B1 | 10/2001 | Apte |
| 6,304,871 B1 | 10/2001 | Gajda et al. |
| 6,314,430 B1 | 11/2001 | Chang |
| 6,317,738 B1 | 11/2001 | Lohman et al. |
| 6,324,525 B1 | 11/2001 | Kramer et al. |
| 6,324,619 B1 | 11/2001 | Raverdy et al. |
| 6,332,161 B1 | 12/2001 | Sasson |
| 6,353,820 B1 | 3/2002 | Edwards et al. |
| 6,363,363 B1 | 3/2002 | Haller et al. |
| 6,363,499 B1 | 3/2002 | Delo et al. |
| 6,381,609 B1 | 4/2002 | Breitbart et al. |
| 6,430,556 B1 | 8/2002 | Goldberg et al. |
| 6,438,749 B1 | 8/2002 | Chamberlain |
| 6,442,533 B1 | 8/2002 | Hinkle |
| 6,442,748 B1 | 8/2002 | Bowman-Amuah |
| 6,453,127 B2 | 9/2002 | Wood et al. |
| 6,463,343 B1 | 10/2002 | Emens et al. |
| 6,463,439 B1 | 10/2002 | Dahlberg |
| 6,467,079 B1 | 10/2002 | Ettritch et al. |
| 6,470,384 B1 | 10/2002 | O'Brien et al. |
| 6,473,786 B1 | 10/2002 | Scouras et al. |
| 6,477,580 B1 | 11/2002 | Bowman-Amuah |
| 6,477,590 B1 | 11/2002 | Habusha et al. |
| 6,480,860 B1 | 11/2002 | Monday |
| 6,480,894 B1 | 11/2002 | Courts et al. |
| 6,484,310 B1 | 11/2002 | Przybylski et al. |
| 6,502,095 B2 | 12/2002 | Breitbart et al. |
| 6,502,207 B1 | 12/2002 | Itoh et al. |
| 6,505,238 B1 | 1/2003 | Tran |
| 6,510,352 B1 | 1/2003 | Badavas et al. |
| 6,518,983 B1 | 2/2003 | Grohmann et al. |
| 6,526,571 B1 | 2/2003 | Aizikowitz et al. |
| 6,539,337 B1 | 3/2003 | Provan et al. |
| 6,546,419 B1 | 4/2003 | Humpleman et al. |
| 6,553,428 B1 | 4/2003 | Ruehle et al. |
| 6,557,039 B1 | 4/2003 | Leong et al. |
| 6,567,937 B1 * | 5/2003 | Flores et al. .................. 714/46 |
| 6,571,282 B1 | 5/2003 | Bowman-Amuah |
| 6,571,389 B1 | 5/2003 | Spyker et al. |
| 6,578,068 B1 | 6/2003 | Bowman-Amuah |
| 6,584,497 B1 | 6/2003 | Case et al. |
| 6,590,587 B1 | 7/2003 | Wichelman et al. |
| 6,615,258 B1 | 9/2003 | Barry et al. |
| 6,643,679 B1 | 11/2003 | Erickson et al. |
| 6,654,784 B1 | 11/2003 | Wei |
| 6,657,625 B1 | 12/2003 | Chik et al. |
| 6,675,228 B1 | 1/2004 | Bahrs et al. |
| 6,725,231 B2 | 4/2004 | Hu et al. |
| 6,928,488 B1 | 8/2005 | de Jong et al. |
| 2001/0020255 A1 | 9/2001 | Hofmann et al. |
| 2001/0029604 A1 | 10/2001 | Dreyband et al. |
| 2002/0010867 A1 | 1/2002 | Schaefer et al. |
| 2002/0046239 A1 | 4/2002 | Stawikowski et al. |
| 2002/0055804 A1 | 5/2002 | Betawar et al. |
| 2002/0062475 A1 | 5/2002 | Iborra et al. |
| 2002/0065814 A1 | 5/2002 | Okamoto et al. |
| 2002/0069156 A1 | 6/2002 | Adam et al. |
| 2002/0069192 A1 | 6/2002 | Aegerter |
| 2002/0078115 A1 | 6/2002 | Poff et al. |
| 2002/0103725 A1 | 8/2002 | Martin et al. |
| 2002/0103835 A1 | 8/2002 | Kearney |
| 2002/0109718 A1 | 8/2002 | Mansour et al. |
| 2002/0111995 A1 | 8/2002 | Mansour et al. |
| 2002/0111999 A1 | 8/2002 | Andersson |
| 2002/0116205 A1 | 8/2002 | Ankireddipally et al. |
| 2002/0120685 A1 | 8/2002 | Srivastava et al. |
| 2002/0124113 A1 | 9/2002 | Gargya et al. |
| 2002/0129096 A1 | 9/2002 | Mansour et al. |
| 2002/0133579 A1 | 9/2002 | Bernhardt et al. |
| 2002/0143721 A1 | 10/2002 | Charlet et al. |
| 2002/0143819 A1 | 10/2002 | Han et al. |
| 2002/0144101 A1 | 10/2002 | Wang et al. |
| 2002/0147857 A1 | 10/2002 | Sanchez, II et al. |
| 2002/0178191 A1 | 11/2002 | Sielken |
| 2002/0178434 A1 | 11/2002 | Fox et al. |
| 2002/0188765 A1 | 12/2002 | Fong et al. |
| 2002/0188928 A1 | 12/2002 | Szpak et al. |
| 2003/0009323 A1 | 1/2003 | Adeli |
| 2003/0028555 A1 | 2/2003 | Young et al. |
| 2003/0033121 A1 | 2/2003 | Chen et al. |
| 2003/0033159 A1 | 2/2003 | Altomare |
| 2003/0036809 A1 | 2/2003 | Landman et al. |
| 2003/0046317 A1 | 3/2003 | Cseri et al. |
| 2003/0050897 A1 | 3/2003 | Altomare |
| 2003/0069907 A1 | 4/2003 | Moreau et al. |
| 2003/0084067 A1 | 5/2003 | Obiaya |

| | | | |
|---|---|---|---|
| 2003/0093574 | A1 | 5/2003 | Fablet et al. |
| 2003/0097383 | A1 | 5/2003 | Smirnov et al. |
| 2003/0160813 | A1 | 8/2003 | Raju |
| 2003/0217033 | A1 | 11/2003 | Sandler et al. |
| 2004/0107183 | A1 | 6/2004 | Mangan |
| 2004/0230587 | A1 | 11/2004 | Doddington |
| 2005/0030555 | A1 | 2/2005 | Phenix et al. |

FOREIGN PATENT DOCUMENTS

| | | |
|---|---|---|
| WO | WO 01/63529 | 8/2001 |
| WO | WO 02/46916 | 6/2002 |
| WO | WO 02/46980 | 6/2002 |
| WO | WO 03/001373 | 1/2003 |

OTHER PUBLICATIONS

Betwixt: Turning Beans into XML, Apache Software Foundation, archived Jun. 20, 2002 at <http://web.archive.org/web/20020620000410/http://jakarta.apahce.org.commons/betwixt/>, p. 1 of 1, Nov. 13, 2005.

Brodkin, Brodkin, Use XML Data Binding to do your Laundry, retrieved from the internet on May 19, 2006, acessed and printed from from the internet on May 19, 2006 at http://www.javaworld.com/javaworld/jw-12-2001/jw-1228-jaxb. htmI.

Unknown, Conjuring up COM through Scripting, p. 14, Jul. 2000.

Thomas, Enterprise Javabeans(TM) Technology: Server Component Model for the Java(TM) platform, java.sun.com, May 2, 1999.

Frank M. Carrano, et al., Frank M. Carrano, et al., Data Abstraction and Problem Solving with C++, Aug. 1998, Addison-Wesley, Chapter 2.

Rennhackkamp, One For The Road: Sybase's Adaptive Server Anywhere 6.0, M&T Publishing Inc., Section No. 10, vol. 11, p. 55, Issn. 1041-5173.

McClanahan, PowerBuilder3.0, M&T Publishing Inc., vol. 6, No. 11, p. 57, lssn. 1041-5173, Oct. 1993.

Quantum SPC/DC Script File (.tdf) Definition Instruction Guide, ASI Data Myte Inc., Version 2.4, p. 2-14.

Myers, Scripting Graphical Applications by Demonstration, Human Computer Interaction Institute, Carnegie Melon University, www.cs.cmu.edu/bam, p. 1-8, Apr. 1998.

Ousterhoust, Scripting Higher Level Programming for the 21st Century, Sun Microsystems Laboratories, Draft #2, p. 1-14, May 10, 1997.

XML Schema Part 0 Primer-W3C Working Draft, W3C, Feb. 2000, Retrieved from the Internet on Nov. 18, 2005 at <http://www.w3.org/TR/2000/WD-xmlschema-0-20000225/>, 42 pages.

Notification of Transmittal of the International Search Report and the Written Opinion issued in PCT/US2007/014105 dated Sep. 4, 2008.

\* cited by examiner

METHOD AND SYSTEM FOR MONITORING NON-OCCURRING EVENTS

CROSS-REFERENCE TO RELATED APPLICATIONS

This patent application claims priority to U.S. Provisional Patent Application No. 60/805,044, filed Jun. 16, 2006, which is hereby incorporated by reference herein in its entirety.

FIELD OF THE INVENTION

The present invention relates generally to monitoring transmissions, and more specifically to detecting non-occurrence of scheduled transmissions and/or other events in a computer implemented environment.

BACKGROUND OF THE INVENTION

As our daily work is more and more related to computers, how to properly maintain and monitor an institution's computer system is a challenge. For example, in order to protect the institution's computer system from virus invasion, an anti-virus program needs to be run and check the system routinely. If the program does not make the scheduled checks, a virus may damage the system, which may cause loss of critical information and failure of important operations. As another example, a financial institution may send clients' trade records or transaction data at a designated time on a daily basis. If its computer system does not transmit these data according to the scheduled timeframe, the customers' business may be adversely affected.

Most current systems detect occurrence of scheduled events. However, there is no reliable solution for monitoring and warning when scheduled events fail to occur. Other drawbacks may also be present.

SUMMARY OF THE INVENTION

Accordingly, one aspect of the invention is to address one or more of the drawbacks set forth above. According to an embodiment of the present invention, a method and system monitors non-occurrence of scheduled events and further warns one or more individuals (e.g., designated contacts, recipients, users, services, etc.) of the non-occurrence.

According to an exemplary embodiment of the present invention, a computer implemented method for monitoring objects relating to events comprises the steps of: receiving an event message; filtering the event message to identify at least one object; comparing a current status of the object with an expected status for the object; and identifying a non-occurrence of an event associated with the object based at least in part on the step of comparing.

In accordance with other aspects of this exemplary embodiment of the present invention, the method may further include generating a notification message identifying the non-occurrence; and sending the notification message to an intended recipient via a preferred mode of communication; the step of categorizing the non-occurrence based on a scale of importance; wherein the notification message and mode of communication are based at least in part on the step of categorizing; wherein the preferred mode of communication comprises one or more of pager, cell phone, wireless device, PDA, instant message, and email transmission; wherein the notification message comprises one of a warning message, an error message and an urgent message; the steps of after sending the notification message, determining whether the current status meets the expected status and sending an OK message canceling out the notification message; the step of checking for new objects and wherein the steps of generating a notification message identifying the non-occurrence; and sending the notification message to an intended recipient via a preferred mode of communication are performed on a separate platform.

According to an exemplary embodiment of the present invention, a computer implemented system for monitoring objects relating to events comprises a module for receiving an event message; a filtering module for filtering the event message to identify at least one object; a comparing module for comparing a current status of the object with an expected status for the object; and an identification module for identifying a non-occurrence of an event associated with the object based at least in part on a comparison of the current status and the expected status.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

DETAILED DESCRIPTION OF EXEMPLARY EMBODIMENT(S)

An embodiment of the present invention monitors non-occurrence of scheduled events and further warns one or more individuals (e.g., designated contacts, recipients, users, services, etc.) of the non-occurrence. According to one exemplary embodiment, an Event Monitor Server may receive event messages from an Event Messaging System. After identifying corresponding objects associated with an event, the Event Monitor Server may compare current status data of the objects to expected status data. The Event Monitor Server may place current status data corresponding to each object into an Object Status Database. Based on the comparison, the Event Monitor Server may validate whether the object events occurred and/or whether expectations were met. In response, the Event Monitor Server may generate a message (e.g., a tokenized event message) and send the message to a designated recipient. The Event Monitor Server may warn or remind the recipient (e.g., responsible person, etc.) to take action or otherwise address or acknowledge the non-occurrence of the monitored object. Varying levels of urgency may also be conveyed to the recipients by the message, mode of communication, intended recipients, number of intended recipients, etc.

Figure 1:
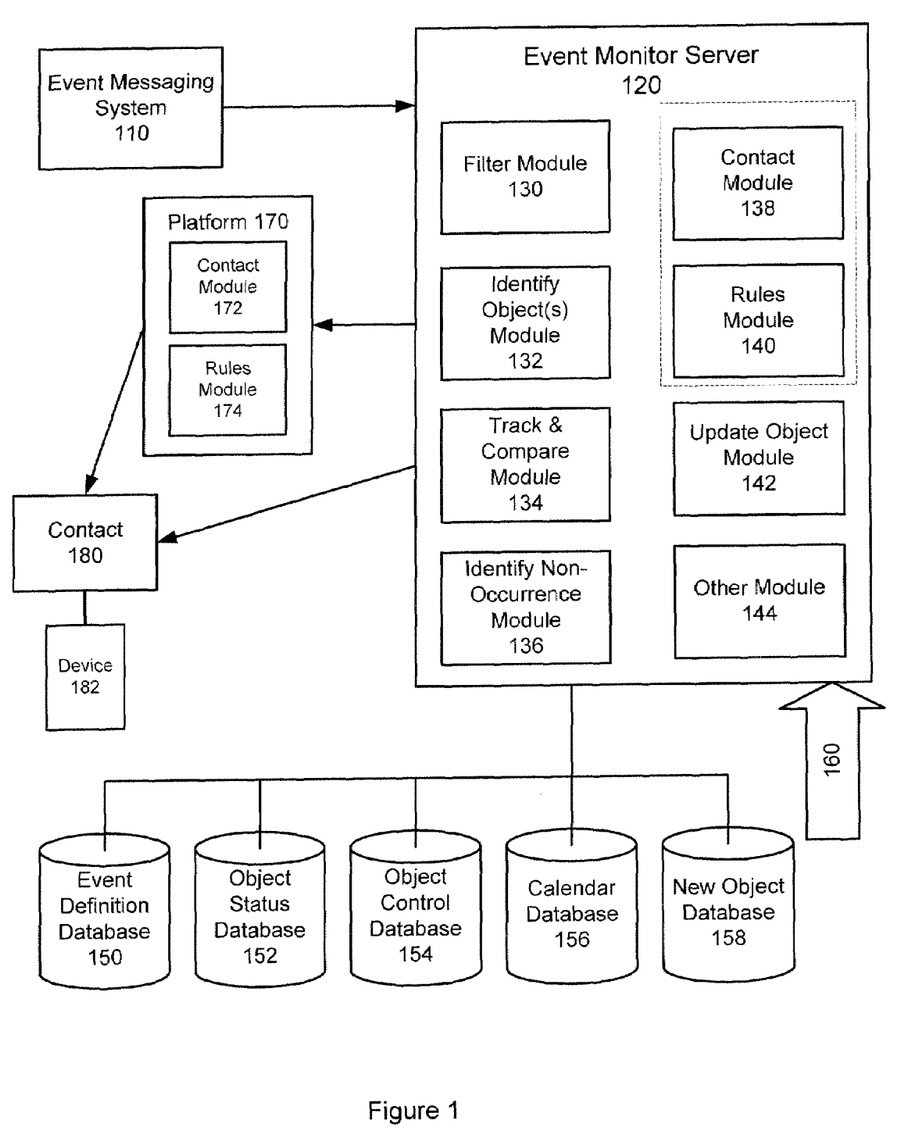
FIG. 1 is an exemplary diagram of a system for monitoring non-occurrence of events, according to an embodiment of the present invention.

FIG. 1 is an exemplary diagram of a system for monitoring non-occurrence of events, according to an embodiment of the present invention. Event Monitor Server 120 may communicate with Event Messaging System 110. Event Messaging System 110 may generate messages from events generated by applications, subsystems and/or systems. Event Messaging System 120 may identify a non-occurrence of an event and forward that information in the form of a message to designated recipient(s), as represented by Contact 180. The message may be generated and formatted by Event Monitor Server 120 or via a separate platform, as shown by Platform 170.

Event Monitor Server 120 may include various modules, functions, interfaces and/or other components for performing monitoring functionality in accordance with the various embodiments of the present invention. For example, Event Monitor Server 120 may include Filter Event Module 130, Identify Object(s) Module 132, Track and Compare Module 134, Identify Non-Occurrence Module 136, Contact Module 138, Rules Module 140, Update Object Module 142 and/or other modules, interfaces and/or processors, as represented by Other Module 144. While a single illustrative block, module or component is shown, these illustrative blocks, modules or components may be multiplied for various applications or different application environments. In addition, the modules or components may be further combined into a consolidated unit. Other architectures may be realized. The modules and/or components may be further duplicated, combined and/or separated across multiple systems at local and/or remote locations. For example, some of the modules or functionality associated with the modules may be supported by a separate application or platform. According to one example, the Contact Module 138 and Rules 140, as shown by the dotted line, may be supported by Platform 170, as shown by Contact Module 172 and Rules Module 174. Other variations may be realized.

In addition, Event Monitor Server 120 may access data from various sources, such as Event Definition Database 150, Object Status Database 152, Object Control Database 154, Calendar Database 156, New Object Database 158 and/or other sources of information. In addition, a Data Feed 160 may provide other relevant information, such as current events, weather conditions, blackouts, etc. that may affect performance or receipt of data transmissions. Data Feed 160 may transmit information in real time, information that is predetermined and/or other relevant data. Databases may include files, tables and/or other data in various formats. In addition, the databases may be further combined and/or separated. The databases may reside at a single location or separated through multiple locations. In addition, one or more databases may be supported and/or maintained by a single entity, an independent service provider and/or other entity. For example, an independent service provider may support the one or more databases and/or other functionality at a remote location. Other architectures may be realized. The components of the exemplary system diagrams may be duplicated, combined, separated and/or otherwise modified, as desired by various applications of the embodiments of the present invention as well as different payment environments and platforms.

Event Definition Database 150 may maintain parameters that uniquely identify and describe each Event and associate the Event to an Object and an Object State. Database 150 may include tables that contain the Events for the Objects to be monitored for a node or nodes. For example, Event Definition Database 150 may include tables containing event information such as subsystem identifier, event identifier, subject component, event type, dependent information (e.g., depends on file present), size of file (e.g., minimum size of file), group (e.g., groups that are dependent on this transmission), process name, file name, "to" name, unique object name and/or other relevant data.

Object Status Database 152 may include tables that contain the current state of monitored objects. The tables may include an entry for each Object monitored for each node or nodes. For example, a null current status record may indicate that no events were received for the object. Each record in the Object Status Database 152 may be initialized at the beginning of the expected monitored window for the object. For example, Object Status Database 152 may include tables containing status information such as object name, current status, and/or other relevant status information. Object Status Database 152 may dynamically maintain current status data for objects identified for each event.

Object Control Database 154 may include tables that contain profiles of each monitored object, including the current state of the monitored objects in the system/server. The tables may include an entry for each Object monitored for each node. For example, a null current status record may indicate that no events were received for the object. Each record in the Object Control Database 154 may be initialized at the beginning of the expected monitored window for the object. For example, Object Control Database 154 may include tables containing object control information such as object name, whether an object monitor is "active," expected event time window, days scheduled, object frequency, reset time (e.g., reset object for next cycle, etc.), whether a warning message will or will not be generated, whether an error message will or will not be generated, message (e.g., free format text that may be used in the warning/error message where the message may uniquely identify the object, state, expected action, etc.) and/or other relevant object data.

Event Monitor Server 120 may communicate with Platform 170 for forwarding non-occurrence information and/or other data. Platform 170 may include an event monitoring and alarming system, which may support customized event collections, paging, emailing and tracking and/or other functionality. According to another example, Event Monitor Server 120 may be separate and distinct from Platform 170. According to another example, Event Monitor Server 120 may be combined with Platform 170 or Event Monitor Server 120 may communicate directly with recipients, as represented by Contact 180. Contact 180 may receive messages delivered to Device 182, which may represent any device capable of receiving data transmission, such as pager, wireless phone, land line phone, PDA, computer, laptop, other wireless devices, etc.

According to one exemplary architecture, Platform 170 may access Event Definition Database 150, Object Status Database 152 and Object Control Database 154. Event Monitor Server 120 may maintain Object Status Database 152 while users (e.g., client, institution, etc.) may maintain Event Definition Database 150 and Object Control Database 154. Platform 170 may allow users to export data tables to Excel or other similar program where the users may modify and/or customize the data.

In a computer system, any occurrence (e.g., data or information transmission between two entities) may be referred to as an event. The events may be divided into object-related events and non object-related events. The object-related events may include objects that are expected to occur at a scheduled timeframe. An example of an object-related event may include a routine virus check which may be scheduled at specific times and days. Another example of an object-related event may include scheduled system file back-up, periodic transmission of data (e.g., data files, customer records, payments, payment data, etc.). The non object-related event may refer to those which may occur once or multiple times without scheduled arrangements. When an event occurs in a computer system, for example, the Event Monitor Server 120 may detect its occurrence and produce an event message which contains information such as current status of the events and their identification numbers assigned to the events.

Filter Event Module 130 may filter event messages from Event Messaging System 110 to identify one or more object-related events. The Event Monitor Server may match each event message to predefined information in an Event Definition Database 150 using an Event ID (or other identifier). Event Definition Database 150 may include a formatted table that contains event identification information for each object-related event. The event identification information may include an event identification number, an object identification number, and token keys and values for uniquely identify an event.

Identify Object(s) Module 132 may identify one or more objects associated with each event. For example, the object identification number may identify object(s) of each event in Object Control Database 154. In general, an object may refer to any component or environment which may be identified as critical and will not cause significant impact if it does not perform as expected.

According to an embodiment of the present invention, Event Monitor Server 120 may read event identification information from Event Definition Database 150 for each object-related event, and place event status data into Object Status Database 152 which indicates current status of each object-related event.

Object Control Database 154 may include a pre-defined file indicating time and/or days on which an event is scheduled to occur. In addition, the Object Control Database 154 may also include a calendar entry which may be tied to Calendar Database 156 for date and time analysis.

Track and Compare Module 134 may compare the status of each object with a corresponding scheduled occurrence of the object to validate whether the scheduled event occurred or not. Other information such as whether the event occurred properly may be determined. For example, Track and Compare Module 134 may sequentially read Object Control Database 154 and Object Status Database 152 to validate expected information and current status information agrees. In addition, Track and Compare Module 134 may determine if an object event is late, if an object event occurred properly and may also identify errors in the transmission. Other determinations may be made. The "expected" information may include expected times for execution, expected length of execution and/or other expected data. For example, each object may be expected to take place within a specified number of hours before its expected time and a specified number of hours after its expected time. According to another example, Object Control Database 154 may also include a calendar entry which may be tied to Calendar Database 156. Any calendar identifier established in Calendar Database 156 may be used as a conditional component for date/time analysis. For example, Calendar Database 156 may provide date/time information that may be used to determine if an event was late, how late, etc.

Identify Non-Occurrence Module 136 may identify a non-occurrence of an event. If a disagreement is found, a message (e.g., a tokenized event message) may be generated and sent to Platform 170 to alarm one or more recipients using event and message information contained in Object Control Database 154.

Identify Non-Occurrence Module 136 may also check for any Object Events that are overdue. In response, a warning message, an error message and/or other type of message may be sent. If an Object Event arrives after a warning or error message has been sent, an "OK" message may be sent to effectively cancel out the prior warning or error message. This will assist support personnel who will not have to log on only to find that Object occurred a few minutes after the error message was sent. If the Object Event has not taken place within the specified time frame (e.g., couple hours of its expected time), a "give up" message may be sent and the Object will not be monitored until its next scheduled time.

In addition, a determination of the level of importance of the non-occurrence may also be made. For example, an object may be related to an event that is considered critical, important, routine and/or minor. Other levels or scales may be customized based on the institution involved. In addition, a determination may be made as to whether an object simply did not occur, whether an object was late, whether the object did not properly perform and/or other determination.

Contact Module 138 may identify who to send a message to and through what medium. For example, if the object event is considered important to the institution or its computer system (e.g., virus checking and system backing up), a notification message may be generated and sent to warn the user immediately. The notification message may be sent via a preferred mode of communication, such as pager, wireless phone, email, text message, ring tone, instant message, and/or other electronic or data transmission. The responsible person may then be prompted to investigate and address the non-occurrence event problem. If the object event is considered to be of minor or medium importance, a notification message may be generated and sent via email or other less urgent communication mode.

According to another embodiment of the present invention, when a responsible person receives a warning message, the person may be given an option to disable the alarm system to avoid all alarms going off. One embodiment may involve generating a warning message that may be returned by a two way pager or mobile phone back to the Event Monitor Server, turning off the alarm system, requesting that no more pages be sent for a predetermined time (e.g., the next designated minutes or hours) and/or other action.

Rules Module 140 may generate an appropriate message based on various factors. For example, cryptic non-occurrence events may be automatically translated into a plain text warning message showing the details of the non-occurrence event. As an example, the plain text warning message may include "system back-up failed at 10 p.m. because XX control file can not be initiated."

In addition, Rules Module 140 may also consider the type of communication in determining the level of details contained in the message. For example, a message for transmission by pager may include a short text such as "URGENT— system back-up failed." For an email transmission, more information may be conveyed, such as a graphic illustrating the failure, a link to a user interface to address the event and/or other data, attachments, files, etc. that may be assist the recipient to properly address the non-occurrence. The recipient may also be given the option to respond to the message as well as forward the message to predetermined individuals. For example, if the recipient is unable to address the event, the recipient may forward the message to one or more other recipients for action and response.

In addition, the message may contain a return receipt which confirms that the message has been viewed by the intended recipient. If a return receipt is not received within a predetermined period of time, the message may be sent to another recipient(s) and/or via another mode of communication. According to another example, the message may be sent to the same recipient via a different mode of communication. The predetermined period of time may vary depending on the importance of the event itself. For example, a shorter period of time may be applied for critical events. Rules Module 140 may maintain a hierarchy of contacts and a corresponding hierarchy of modes of communication (e.g., pager, cell phone, email, etc.). For example, if an individual is unreachable by pager, the Event Monitor Server may try a different mode of communication and/or may contact another one or more recipients by pager, cell phone, home phone, work phone, etc. Depending on importance of the event, several recipients may be sent messages simultaneously to elicit a quick response.

Further, the type of the message may also vary. For example, Event Monitor Server 120 may send an initial "warning" message. If the event does not occur after a time period, an "error" message may be sent. If the event still does not occur after another time period, an "URGENT" message may be sent. The text of the message may also reflect the appropriate level of urgency. In addition, the message may include specifics of the non-occurring event, such as how long the non-occurrence has lasted, when the expected occurrence should have occurred, how many events are missing, etc. In addition, the type of transmission and intended recipients may also vary with the urgency of the non-occurrence.

According to another embodiment of the present invention, Event Monitor Server 120 may monitor events in accordance with service level agreements. A service level agreement is a contractual agreement between the System and its users which stipulates the services that the System provides to its users. The service level agreement may specify some number of procedures which need to be carried out in certain order by the computer system. The service level agreement may also specify expected aspects of an application which need to be performed, such as availability, completion of processing, and file transmissions.

For example, a service level agreement may specify that 10 procedures occur in a certain order. If a procedure does not occur properly, e.g., a non-occurrence is detected, Event Monitor Server 120 may identify specifics related to the non-occurrence. This may assist in allowing institutions to perform up to the standards agreed upon. In addition, non-occurrence of certain procedures may be accounted for and an explanation may be ascertained. Therefore, an embodiment of the present invention may improve compliance with standards as well as agreed upon terms and overall integrity of various applications.

The Event Monitor Server may be configured to output warnings at critical points (e.g., 30 minutes) before a service level agreement is breached due to non-occurrences of scheduled events. Further, the Event Monitor Server may output critical error messages if the service level agreement is actually breached. The breaches may be reported automatically so that the users receive reports identifying occurrences and non-occurrences of the scheduled events at designated timeframe. Other information may also be available.

According to another embodiment of the present invention, a report tool may be implemented to compile data relating to the monitored object events. A report may be generated at predetermined intervals, such as end of the day, etc. to provide a comprehensive overview to the user.

According to another scenario, Platform 170 may alarm an event based at least in part on predetermined rules, as shown by Contact Module 172 and Rules Module 174. In addition, Object Control Database 156 may be managed by Platform 170.

Update Object Module 142 may check whether there is updated information regarding event definition information and event object control information by accessing New Object Database 158. In response, the corresponding information in the Event Definition Database 150 and the Object Control Database 154 may be updated.

Figure 2:
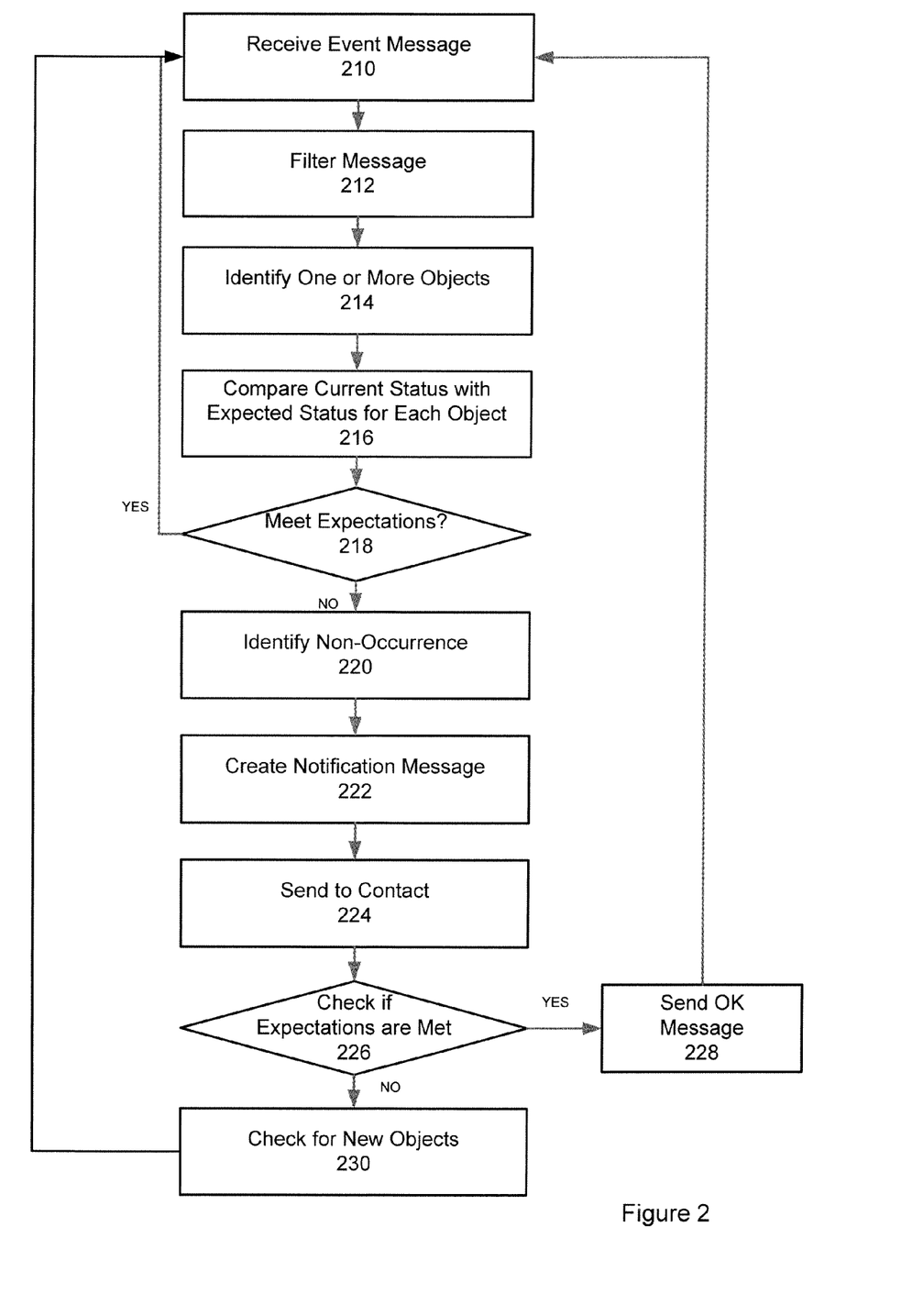
FIG. 2 is an exemplary flowchart illustrating a method for monitoring non-occurrence of events, according to an embodiment of the present invention.

FIG. 2 is an exemplary flowchart illustrating a method for monitoring non-occurrence of events, according to an embodiment of the present invention. At step 210, an event message may be received. At step 212, the message may be filtered. At step 214, one or more objects associated with the event may be identified. At step 216, the current status of the object may be compared with an expected status for each object. At step 218, it may be determined whether expectations are met. If so, the next event message may be received. If not, a non-occurrence may be identified, at step 220. At step 222, a notification message may be created. At step 224, the notification message may be sent to a contact. At step 226, after a predetermined period of time, it may be determined whether expectations are met. If so, an "OK" message may be transmitted to cancel out the previous notification message, at step 228. At step 230, presence of new object may be checked. While the process of FIG. 2 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 210, an event message may be received. As discussed above, the event message may be received from an Event Messaging System. At step 212, the message may be filtered through a filter to identify one or more objects associated with the event. At step 214, the one or more objects associated with the event may be identified.

At step 216, the current status of the object may be compared with an expected status for each object. For example, status data may be accessed from Object Status Database 152 and expected status data may be accessed from Object Control Database 154.

At step 218, it may be determined whether expectations are met. If so, the next event message may be received. If not, a non-occurrence may be identified, at step 220. The non-occurrence may be categorized. For example, categories may include critical, important, routine and/or minor. The categories may vary depending on the user, institution, etc.

An embodiment of the present invention may detect an occurrence of an event which is considered to be a "good" event but not scheduled to occur. If an event is determined to be a "good" event, a notification message will not be sent. While such an occurrence may be considered a non-occurrence, an embodiment of the present invention will recognize that "good" events do not need to be notified. Examples of "good events" may include unscheduled virus checks, file back ups, etc.

At step 222, a notification message may be created. The notification message may be generated based on a template where an appropriate template may be used to sufficiently convey the non-occurrence event. Further, the notification message may be customized based on the importance of the non-occurring event.

At step 224, the notification message may be sent to a contact via a preferred method of communication. Based on an importance of the non-occurrence, an appropriate mode of communication may be identified. The mode of communication may include pager, cell phone, text message, email, instant message and/or other type of electronic contact.

At step 226, after a predetermined period of time, it may be determined whether expectations are met. If so, an "OK" message may be transmitted to cancel out the previous notification message, at step 228. This will assist support personnel who will not have to log on only to find that Object occurred a few minutes after the error message was sent. If the Object Event has not taken place within the specified time frame (e.g., couple hours of its expected time), a "give up" message may be sent and the Object will not be monitored until its next scheduled time.

At step 230, presence of new object may be checked to determine whether there is updated information regarding event definition information and event object control information by accessing New Object Database 158. In response, the corresponding information in the event definition file and the object control file may be updated. The steps of FIG. 2 may be repeated continuously for the next event.

According to an embodiment of the invention, the systems and processes described in this invention may be implemented on any general or special purpose computational device, either as a standalone application or applications, or even across several general or special purpose computational devices connected over a network and as a group operating in a client-server mode. According to another embodiment of the invention, a computer-usable and writeable medium having a plurality of computer readable program code stored therein may be provided for practicing the process of the present invention. The process and system of the present invention may be implemented within a variety of operating systems, such as a Windows® operating system, various versions of a Unix-based operating system (e.g., a Hewlett Packard, a Red Hat, or a Linux version of a Unix-based operating system), or various versions of an AS/400-based operating system. For example, the computer-usable and writeable medium may be comprised of a CD ROM, a floppy disk, a hard disk, or any other computer-usable medium. One or more of the components of the system or systems embodying the present invention may comprise computer readable program code in the form of functional instructions stored in the computer-usable medium such that when the computer-usable medium is installed on the system or systems, those components cause the system to perform the functions described. The computer readable program code for the present invention may also be bundled with other computer readable program software. Also, only some of the components may be provided in computer-readable code.

Additionally, various entities and combinations of entities may employ a computer to implement the components performing the above-described functions. According to an embodiment of the invention, the computer may be a standard computer comprising an input device, an output device, a processor device, and a data storage device. According to other embodiments of the invention, various components may be computers in different departments within the same corporation or entity. Other computer configurations may also be used. According to another embodiment of the invention, various components may be separate entities such as corporations or limited liability companies. Other embodiments, in compliance with applicable laws and regulations, may also be used.

According to one specific embodiment of the present invention, the system may comprise components of a software system. The system may operate on a network and may be connected to other systems sharing a common database. Other hardware arrangements may also be provided.

Other embodiments, uses and advantages of the present invention will be apparent to those skilled in the art from consideration of the specification and practice of the invention disclosed herein. The specification and examples should be considered exemplary only. The intended scope of the invention is only limited by the claims appended hereto.

While the invention has been particularly shown and described within the framework of claims processing, it will be appreciated that variations and modifications can be effected by a person of ordinary skill in the art without departing from the scope of the invention. Furthermore, one of ordinary skill in the art will recognize that such processes and systems do not need to be restricted to the specific embodiments described herein.

The invention claimed is:

1. A computer implemented method for monitoring objects relating to at least one scheduled event, the method comprising the steps of:
   using at least one computer processor to receive an event message related to a scheduled event;
   using the at least one computer processor to filter the event message to identify at least one object associated with the scheduled event;
   using the at least one computer processor to compare a current status of the at least one object with an expected status for the at least one object;
   using the at least one computer processor to identify a non-occurrence of the scheduled event based at least in part on the comparison; using the at least one computer processor to generate a notification message identifying the non-occurrence; using the at least one computer processor to send the notification message to an intended recipient via a preferred mode of communication; and using the at least one computer processor to check for new objects.

2. The method of claim 1, further comprising the step of:
   using the at least one computer processor to categorize the non-occurrence based on a scale of importance.

3. The method of claim 2, wherein the notification message and mode of communication are based at least in part on the step of categorizing.

4. The method of claim 2, wherein the preferred mode of communication comprises one or more of a pager, a cell phone, a wireless device, a PDA, an instant message, and an email transmission.

5. The method of claim 1, wherein the notification message comprises one of a warning message, an error message and an urgent message.

6. The method of claim 1, further comprising the steps of:
   after sending the notification message, using the at least one computer processor to determine whether the current status meets the expected status; and
   using the at least one computer processor to send an OK message canceling out the notification message.

7. The method of claim 1, wherein the steps of generating a notification message identifying the non-occurrence; and sending the notification message to an intended recipient via a preferred mode of communication are performed on a separate platform.

8. A system for monitoring objects relating to at least one scheduled event, the system comprising:
   at least one computer server, the at least one computer server comprising:
      a module for receiving an event message related to a scheduled event;
      a filtering module for filtering the event message to identify at least one object associated with the scheduled event;
      a comparing module for comparing a current status of the at least one object with an expected status for the at least one object;
      an identification module for identifying a non-occurrence of the scheduled event based at least in part on a comparison of the current status and the expected status; a module for generating a notification message identifying the non-occurrence and sending the notification message to an intended recipient via a preferred mode of communication; and a module for checking for new objects.

9. The system of claim 8, wherein the non-occurrence is categorized based on a scale of importance.

10. The system of claim 9, wherein the notification message and mode of communication are based at least in part on the step of categorizing.

11. The system of claim 9, wherein the preferred mode of communication comprises one or more of a pager, a cell phone, a wireless device, a PDA, an instant message, and an email transmission.

12. The system of claim 8, wherein the notification message comprises one of a warning message, an error message and an urgent message.

13. The system of claim 8, wherein after sending the notification message, a determination is made as to whether the current status meets the expected status; and wherein an OK message is sent to cancel out the notification message.

14. The system of claim 8, further comprising:
 a separate platform for generating a notification message identifying the non-occurrence; and
 sending the notification message to an intended recipient via a preferred mode of communication.

15. A computer implemented method for monitoring objects relating to at least one scheduled event, the method comprising the steps of:
 using at least one computer processor to receive an event message related to a scheduled event;
 using the at least one computer processor to filter filtering the event message to identify at least one object associated with the scheduled event;
 using the at least one computer processor to compare a current status of the at least one object with an expected status for the at least one object;
 using the at least one computer processor to identify a non-occurrence of the scheduled event based at least in part on the comparison;
 using the at least one computer processor to categorize the non-occurrence based on a scale of importance;
 using the at least one computer processor to generate a notification message identifying the non-occurrence; and
 using the at least one computer processor to send the notification message to an intended recipient via a preferred mode of communication,
 wherein the notification message and mode of communication are based at least in part on the comparison;
 wherein the preferred mode of communication comprises one or more of pager, cell phone, wireless device, PDA, instant message, and email transmission; and
 wherein the notification message comprises one of a warning message, an error message and an urgent message.

16. A system for monitoring objects relating to at least one scheduled event, comprising:
 at least one computer processor; and
 a computer-readable media comprising code that, when executed by the at least one computer processor, performs the steps of:
 receiving an event message related to a scheduled event;
 filtering the event message to identify at least one object associated with the scheduled event;
 comparing a current status of the at least one object with an expected status for the at least one object;
 identifying a non-occurrence of the scheduled event based at least in part on the step of comparing; generating a notification message identifying the non-occurrence; sending the notification message to an intended recipient via a preferred mode of communication; and checking for new objects.

* * * * *